(12) United States Patent
Harada et al.

(10) Patent No.: US 8,537,666 B2
(45) Date of Patent: Sep. 17, 2013

(54) RADIO RESOURCE RELEASE CONTROLLING METHOD, RADIO BASE STATION, AND MOBILE STATION

(75) Inventors: Atsushi Harada, Kawasaki (JP); Minami Ishii, Yokohama (JP); Sadayuki Abeta, Yokohama (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 816 days.

(21) Appl. No.: 12/438,355

(22) PCT Filed: Aug. 17, 2007

(86) PCT No.: PCT/JP2007/066054
§ 371 (c)(1),
(2), (4) Date: May 15, 2009

(87) PCT Pub. No.: WO2008/023649
PCT Pub. Date: Feb. 28, 2008

(65) Prior Publication Data
US 2010/0177716 A1 Jul. 15, 2010

(30) Foreign Application Priority Data
Aug. 22, 2006 (JP) ................................. 2006-225916

(51) Int. Cl.
*H04J 1/16* (2006.01)
(52) U.S. Cl.
USPC ........... 370/230; 370/349; 370/389; 370/497; 370/516; 370/471
(58) Field of Classification Search
None
See application file for complete search history.

(56) References Cited

U.S. PATENT DOCUMENTS

| 6,963,545 | B1 | 11/2005 | Ho | |
|---|---|---|---|---|
| 2004/0082356 | A1 | 4/2004 | Walton et al. | |
| 2005/0078651 | A1* | 4/2005 | Lee et al. | 370/349 |
| 2005/0154583 | A1* | 7/2005 | Naka et al. | 704/217 |
| 2006/0223564 | A1* | 10/2006 | Rosen et al. | 455/519 |
| 2007/0105567 | A1* | 5/2007 | Mohanty et al. | 455/458 |
| 2010/0220693 | A1* | 9/2010 | Ho | 370/336 |

FOREIGN PATENT DOCUMENTS

| CN | 1637856 | A | 7/2005 |
| EP | 1509011 | A2 | 2/2005 |
| EP | 1548703 | B1 | 11/2006 |
| JP | 09152894 | A | 6/1997 |
| JP | 11-167396 | A | 6/1999 |
| JP | 2001320422 | A | 11/2001 |

(Continued)

OTHER PUBLICATIONS

Kazumi Watanabe et al., "Tekio Access Seigyo Hoshiki o Mochiita Tekio Hencho Yoyaku-gata TDMA System", The Transactions of the Institute of Electronics, Information and Communication Engineers B, vol. J83-B, No. 12, pp. 1682 to 1691, Dec. 25, 2000, p. 1682, right col., lines 5 to 17, and its English Translation.

(Continued)

*Primary Examiner* — Kibrom T Hailu
*Assistant Examiner* — Dady Chery
(74) *Attorney, Agent, or Firm* — Osha Liang LLP

(57) ABSTRACT

A mobile station performing a voice communication by using a radio resource, including a determination unit configured to determine whether an inputted packet is in a talk-spurt state or in a silent state; a message generating unit configured to generate a resource release request, when the determination unit determines that the inputted packet is in the silent state; and a transmitting unit configured to transmit the resource release request to a radio base station.

2 Claims, 12 Drawing Sheets

(56) References Cited

FOREIGN PATENT DOCUMENTS

| JP | 2003244238 A | 8/2003 |
|----|--------------|--------|
| JP | 2005-101709 A | 4/2005 |
| WO | 01/58095 A1 | 8/2001 |
| WO | 2006/073223 A1 | 7/2006 |

OTHER PUBLICATIONS

RFC3267, Real-Time Transport Protocol (RTP) Payload Format and File Storage Format for the Adaptive Multi-Rate (ARM) and Adaptive Multi-Rate Wideband (AMR-WB) Audio Codecs.

International Search Report for PCT/JP2007/066054 mailed Oct. 2, 2007 (6 pages).
Written Opinion of ISA mailed Oct. 2, 2007 (3 pages).
Chinese Office Action for Application No. 200780031235.5, mailed on Jun. 12, 2010 (25 pages).
Extended European Search Report in corresponding European Application No. 07792670.7 dated Mar. 6, 2013 (8 pages).
Japanese Office Action for Application No. 2008-530888, mailed on Mar. 8, 2011 and English translation thereof, 5 pages.

* cited by examiner

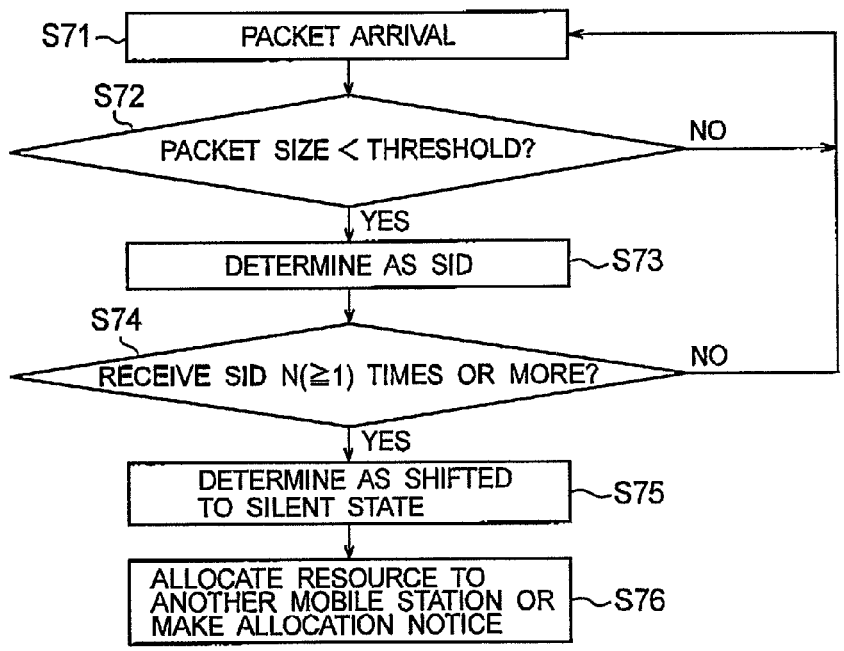
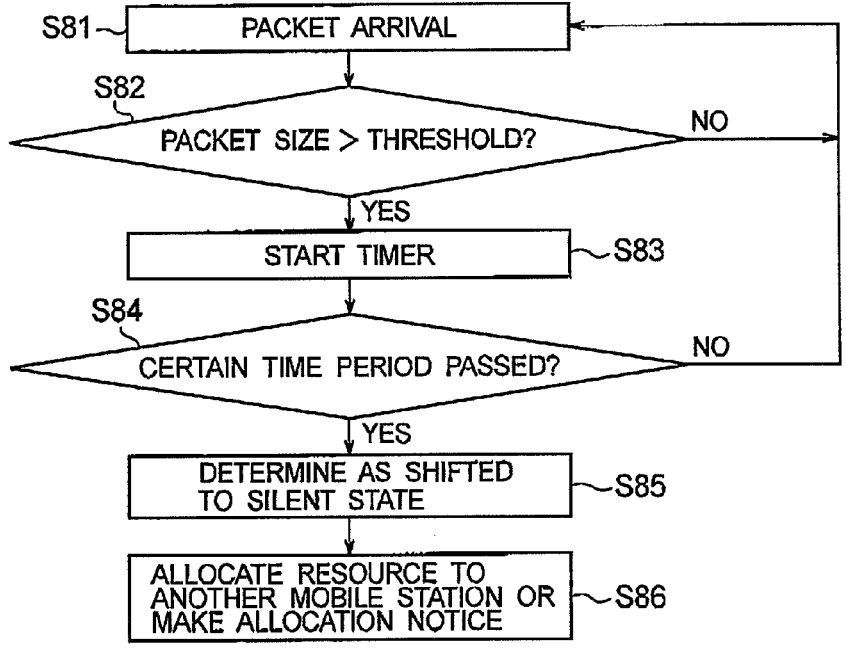

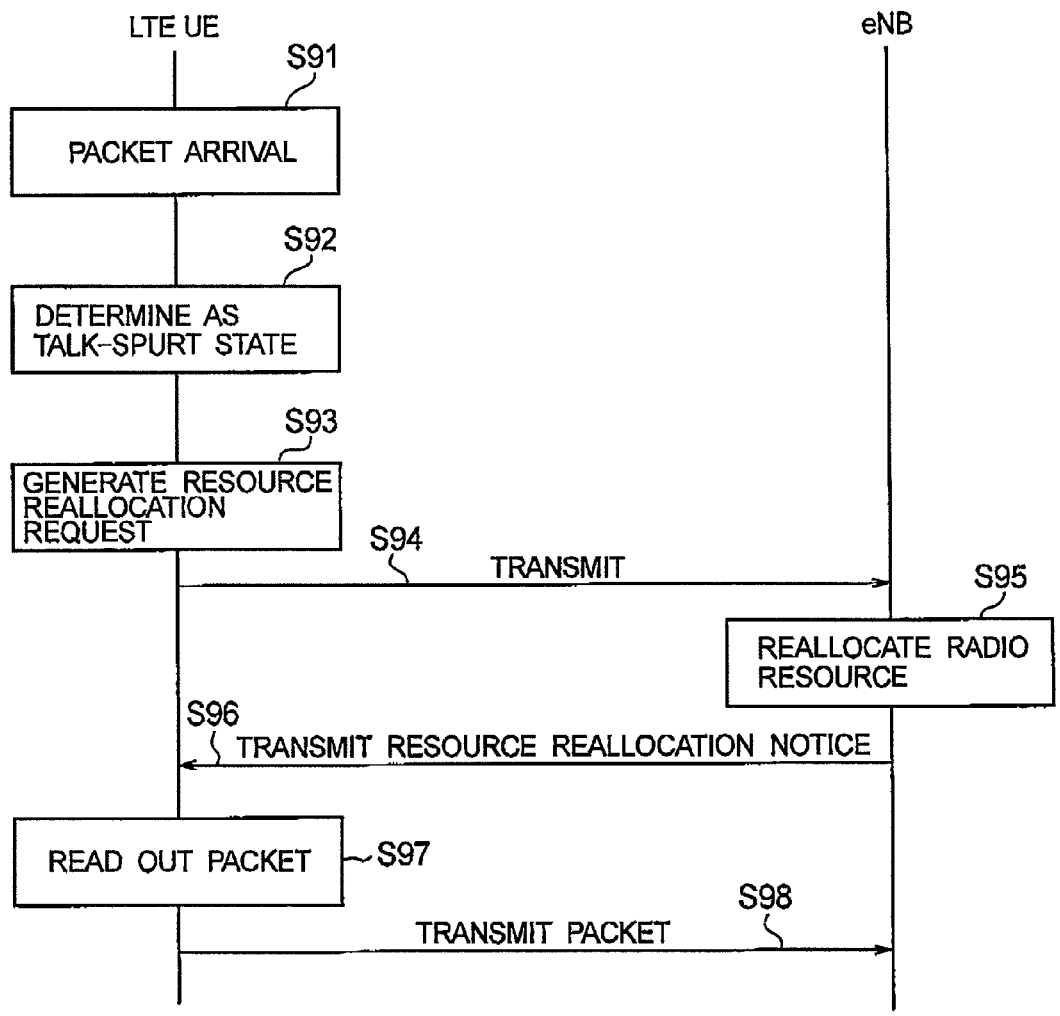

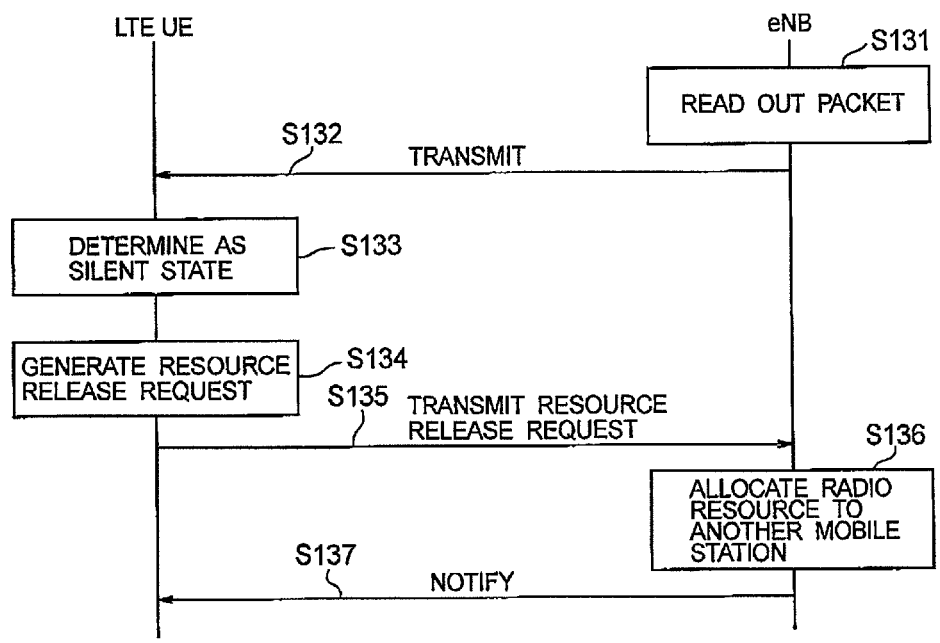
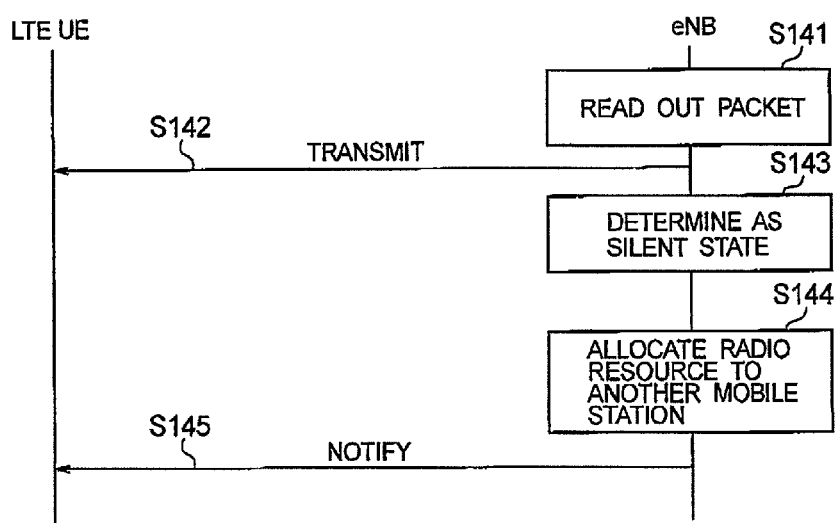

RADIO RESOURCE RELEASE CONTROLLING METHOD, RADIO BASE STATION, AND MOBILE STATION

TECHNICAL FIELD

The present invention relates to a radio communication control technique. Particularly, the present invention relates to a radio resource release controlling method that releases a radio resource based on whether a state in a voice communication is a talk-spurt state or a silent state, and a radio base station and a mobile station that perform such control.

BACKGROUND ART

There has been known a persistent scheduling for controlling a radio resource allocation periodically in order to allocate the radio resources to a transmission packet of a first transmission.

The persistent scheduling is expected to be applied mainly to voice communications, such as VoIP.

This is because the persistent scheduling can allow a reduction in the overhead of a control channel used for notifying an allocation of the radio resource, and thus the persistent scheduling is suitable for communications in which packet are arrived at certain intervals and which are performed at a low rate.

On the other hand, a field that stores speech information is provided in an RTP (Real-time Transport Protocol) payload format used for transmitting speech data in an adaptive multi-rate (AMR) method or an adaptive multi-rate wide band (AMR-WB) method.

The speech information includes a speech frame or a comfort noise frame. From this field, a talk-spurt period or a silent period can be detected (for example, see Non-Patent Document 1).

Generally, in the voice communications, it is often the case that, when one side is speaking, the other side is in a silent state.

When considering a case in which the radio resource allocated to a specific mobile station by the persistent scheduling is temporarily released when the specific mobile station is in such a silent state, and such radio resource is allocated to another mobile station. In such case, a statistical multiplexing effect which achieves an efficient use of a fixed channel capacity can be expected. This also leads to an effective utilization of the radio resource.

However, neither a radio base station (eNB: evolved Node B) nor a mobile station (UE: User Equipment) becomes aware that an audio codec detects a talk-spurt/silent period in an application layer.

Thus, in order to release the radio resource based on whether the state is the talk-spurt state or the silent state, the radio base station or the mobile station needs to be notified of the detection of the silent state (for example, in an MAC layer), or to presume the detection of the silent state.

Non-Patent Document 1: RFC3267, Real-Time Transport Protocol (RTP) Payload Format and File Storage Format for the Adaptive Multi-Rate (AMR) and Adaptive Multi-Rate Wideband (AMR-WB) Audio Codec

DISCLOSURE OF THE INVENTION

Therefore, the present invention is made in view of the above-described problems, and provides a radio resource release controlling method based on whether the state is the talk-spurt state or the silent state, and a radio base station and a mobile station which can perform such resource release control.

A first aspect of the present invention is summarized as a radio resource release controlling method that controls a release of a radio resource in a voice communication performed by a mobile station using the radio resource that is persistently allocated, the radio resource release controlling method including: determining whether or not a state is a silent state, in accordance with a size of an inputted packet; and temporarily releasing the radio resource, when the state is determined as the silent state.

In the first aspect of the present invention, determining whether or not the state is the silent state may includes: determining that the inputted packet is not a speech packet, when the size of the inputted packet is smaller than a first threshold; and determining that the state is the silent state, when a packet other than the speech packet continuously arrives a predetermined number of times or more.

In the first aspect of the present invention, determining whether or not the state is the silent state may include: determining that the inputted packet is a speech packet, when the size of the inputted packet is larger than a second threshold; and determining that the state is the silent state, when a certain time period passes after an arrival of the speech packet.

The first aspect of the present invention may further include: allocating the radio resource that is released, to another mobile station.

The first aspect of the present invention may further include: determining that the state is a talk-spurt state, in accordance with any one of the size of the inputted packet and an arrival interval of the inputted packet; and performing a radio resource reallocation to the voice communication, when the state is determined as the talk-spurt state after the silent state.

In the first aspect of the present invention, in determining that the state is the talk-spurt state, the inputted packet may be determined as the talk-spurt state and the state is determined as shifted to the talk-spurt state, when the size of the inputted packet is larger than a second threshold.

In the first aspect of the present invention, in determining that the state is the talk-spurt state, the state may be determined as shifted to the talk-spurt state, when the arrival interval of the inputted packet is shorter than a predetermined interval.

In the first aspect of the present invention, determining that the state is the silent state may be performed by the mobile station performing the voice communication. And the first aspect of the present invention may further include: transmitting a resource release request to a radio base station, when the silent state is detected.

In the first aspect of the present invention, determining that the state is the silent state may be performed by a radio base station. And the first aspect of the present invention may further include: transmitting a resource release notice to the mobile station performing the voice communication, when the silent state is detected.

In the first aspect of the present invention, determining that the state is the talk-spurt state may be performed by the mobile station performing the voice communication. And the first aspect of the present invention may further include: transmitting a resource reallocation request to a radio base station, when the state is determined as the talk-spurt state after the silent state.

In the first aspect of the present invention, determining that the state is the talk-spurt state may be performed by a radio base station. And the first aspect of the present invention may further include: transmitting a resource reallocation request to the mobile station performing the voice communication, when the state is determined as the talk-spurt state after the silent state.

A second aspect of the present invention is summarized as a mobile station, including: a determination unit configured to determine whether an inputted packet is in a talk-spurt state or in a silent state; a message generating unit configured to generate a resource release request, when the determination unit determines that the inputted packet is in the silent state; and a transmitting unit configured to transmit the resource release request to a radio base station.

In the second aspect of the present invention, the determination unit may determine that the inputted packet is not a speech packet, when a size of the inputted packet is smaller than a first threshold; and the determination unit may determine that the inputted packet is in the silent state, when a packet other than the speech packet continuously arrives a predetermined number of times or more.

In the second aspect of the present invention, the determination unit may determine that the inputted packet is a speech packet, when a size of the inputted packet is larger than a second threshold; and the determination unit may determine that the inputted packet is in the silent state, when a following speech packet is not detected and when a certain time period passes after an input of the speech packet.

In the second aspect of the present invention, the determination unit may determine that a state has been shifted to the talk-spurt state, when the inputted packet larger than the second threshold is detected after the silent state; and the message generating unit may generate a resource reallocation request.

In the second aspect of the present invention, the determination unit may measure a packet arrival interval when the inputted packet arrives after the silent state, and determines that a state has been shifted to the talk-spurt state, when the packet arrival interval is smaller than a third threshold; and the message generating unit may generate a resource reallocation request.

A third aspect of the present invention is summarized as a radio base station, including: a determination unit configured to determine whether an inputted packet is in a talk-spurt state or in a silent state; and a scheduler configured to release a radio resource persistently allocated to a mobile station that transmits and receives the inputted packet, when the determination unit determines that the inputted packet is in the silent state.

The third aspect of the present invention may further include: a message generating unit configured to generate a resource release notice, when the determination unit determines that the inputted packet is in the silent state; and a transmitting unit configured to transmit the resource release notice to the mobile station.

In the third aspect of the present invention, the scheduler may allocate the radio resource that is released, to another mobile station.

In the third aspect of the present invention, the determination unit may determine that the inputted packet is not a speech packet, when the size of the inputted packet is smaller than a first threshold; and the determination unit may determine that the inputted packet is in the silent state, when a packet other than the speech packet continuously arrives a predetermined number of times or more.

In the third aspect of the present invention, the determination unit may determine that the inputted packet is a speech packet, when the size of the inputted packet is larger than a second threshold; and the determination unit may determine that the inputted packet is in the silent state, when a following speech packet is not detected and when a certain time period passes after an input of the speech packet.

In the third aspect of the present invention, the determination unit may determine that a state has been shifted to the talk-spurt state, when the inputted packet larger than the second threshold is detected after the silent state; and the scheduler may perform a radio resource reallocation to the mobile station.

In the third aspect of the present invention, the determination unit may measure a packet arrival interval when the inputted packet arrives after the silent state, and determines that a state has been shifted to the talk-spurt state, when the packet arrival interval is smaller than a third threshold; and the scheduler may perform a radio resource reallocation to the mobile station.

In the first and the second aspects of the present invention, the resource release request may be transmitted by using a buffer status report reporting a data amount stored in a transmission buffer of the mobile station.

In the first and the second aspects of the present invention, the buffer status report may report a data amount of 0 byte.

In the first aspect of the present invention, the buffer status report may include a specific bit string that indicates the resource release request.

In the first and the second aspects of the present invention, the buffer status report may report the data amount stored in the transmission buffer of the mobile station, the mobile station relating to a radio access bearer to which the radio resource is persistently allocated.

In the first and the second aspects of the present invention, the resource release request may be transmitted by using a scheduling request requesting, at the mobile station, an allocation of an uplink dedicated resource.

In the first aspect of the present invention, the resource release request may be transmitted by using a buffer status report reporting a data amount stored in a transmission buffer of the mobile station.

The second aspect of the present invention may further include: a radio resource controlling unit configured to release the radio resource corresponding to the resource release request, after transmitting the resource release request to the radio base station.

The second aspect of the present invention may further include: a radio resource controlling unit configured to release the radio resource corresponding to a resource release notice, after receiving the resource release notice from the radio base station.

BRIEF DESCRIPTION OF THE DRAWINGS

FIG. 7 is a flow chart showing an example of silent state determination processing in the radio base station.

FIG. 8 is a flow chart showing another example of a process of a silent state determination performed by the radio base station.

FIG. 9 shows a sequence of a resource reallocation control in accordance with an allocation request from the mobile station in the uplink.

FIG. 13 shows a sequence of the resource release control for a downlink, in accordance with the release request from the mobile station.

FIG. 14 is a sequence diagram of the resource release control in the downlink, according to the silent state determination in the radio base station.

BEST MODE FOR CARRYING OUT THE INVENTION

Preferable embodiments of the present invention will be explained below with reference to the drawings. For convenience of explanation, a control in an uplink speech transmission and a control in a downlink speech transmission are explained separately, although the basic concept is the same.

Note that this embodiment is configured to determine whether or not a state of the packet is in a silent state in an MAC layer, in accordance with a packet size to be described later.

In this embodiment, it is possible to determine that the state is a silent state or a talk-spurt state, by presuming whether a packet is a speech packet or a packet other than the speech packet (for example, an SID (silent descriptor) packet which describes a silent state) in accordance with, for example, a packet length.

In order to secure the reliability of the determination, in this embodiment, it is preferably determined the state has been shifted to the silent state, when a specific buffer state continues for a certain time period.

For example, in this embodiment, the state of the communication may be in the silent state when a predetermined number or more of packet other then the speech packet continuously arrive. Alternatively, the state of the communication may be determined that the state is the silent state when a speech packet is not received for a certain time period after the arrival of the packet having a long size (presumed as a speech packet).

<Radio Resource Release Control in an Uplink>

Figure 1:
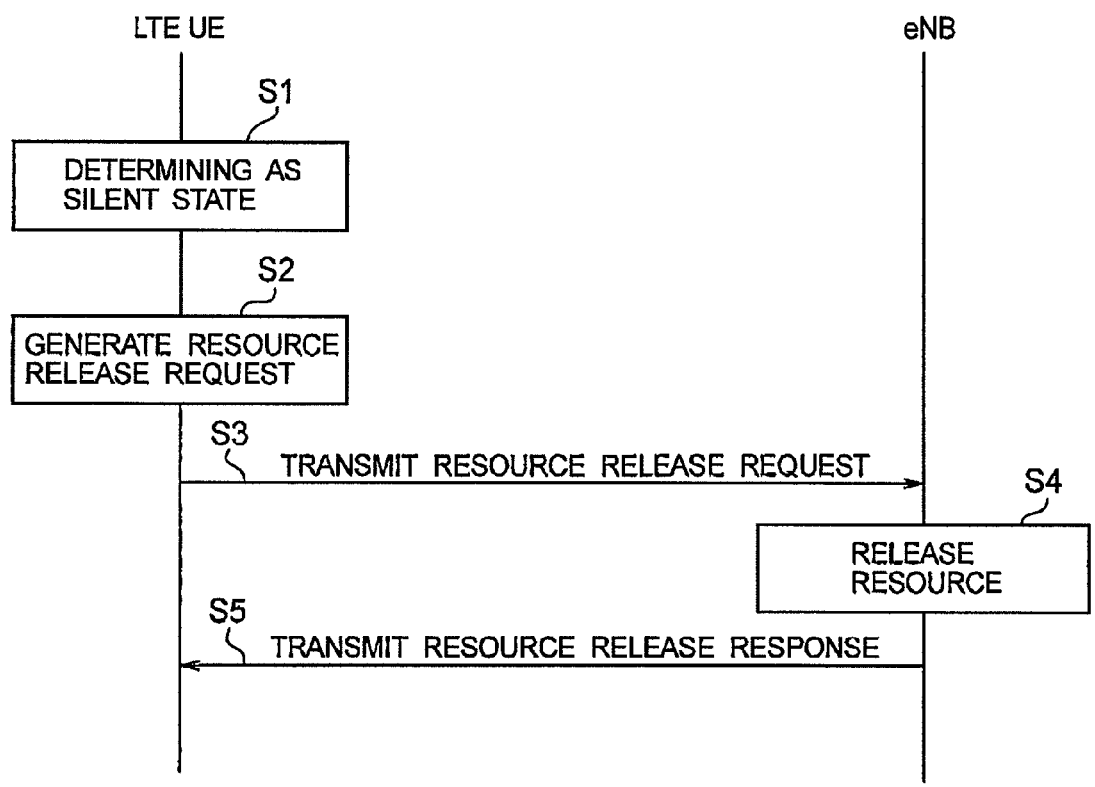
FIG. 1 is a sequence diagram of a resource release control in accordance with a release request from a mobile station in an uplink.

FIG. 1 is a diagram showing a first example of a resource release sequence in an uplink. In this example, a mobile station (or user terminal UE) performs a silent state determination, and a radio resource is released in accordance with a resource release request from the mobile station.

In other words, the mobile station UE determines whether or not speech data to be transmitted to a radio base station (eNB) is in a silent period, during a communication (S1). A detailed description for the determination method of the silent period will be given later.

When the silent period is detected, the mobile station UE generates a resource release request (S2), and transmits the resource release request to the radio base station eNB (S3).

The radio base station that has received the resource release request releases an uplink radio resource persistently allocated to this mobile station UE (S4).

If necessary, a resource release response may be returned to the mobile station UE (S5).

Figure 2:
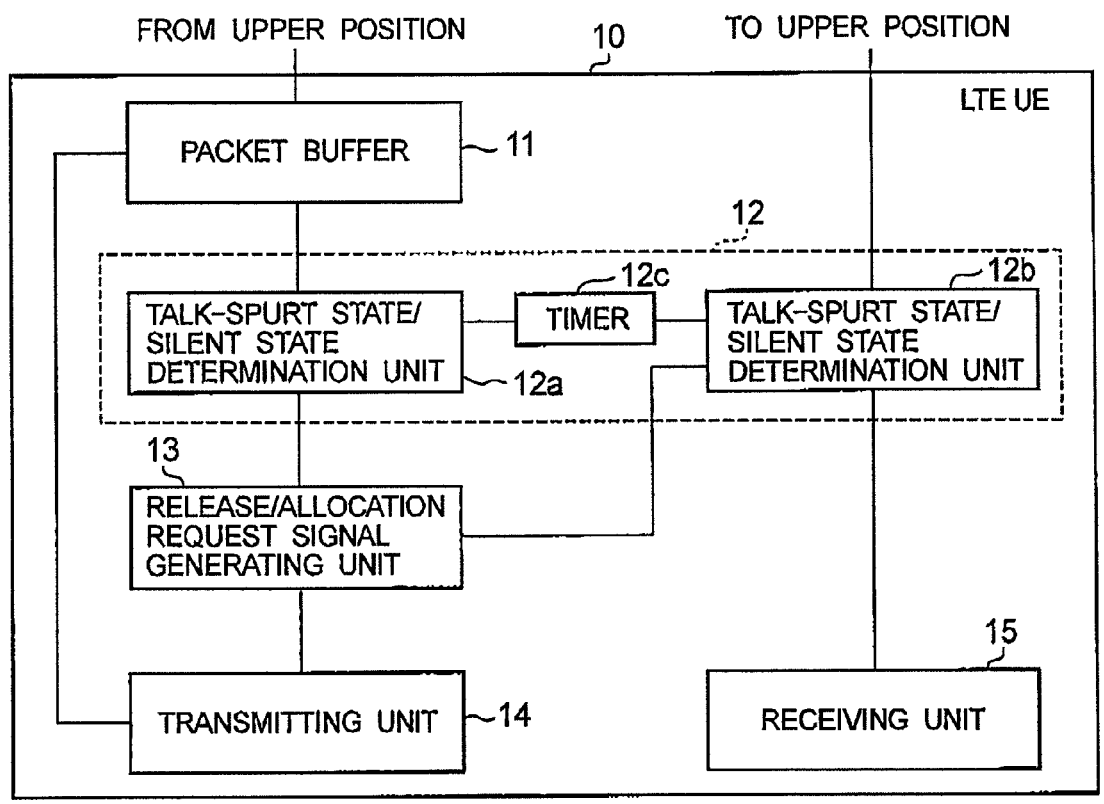
FIG. 2 is a schematic block diagram of the mobile station which performs the resource release control of FIG. 1.

FIG. 2 is a block diagram showing a schematic configuration of a mobile station (UE) 10 that performs the above-described operation.

The mobile station 10 includes: a packet buffer 11 that temporarily stores a transmission packet inputted from an upper layer; and a talk-spurt state/silent state determination unit 12 that determines whether the inputted packet is in a talk-spurt state or in a silent period.

The talk-spurt state/silent state determination unit 12 includes: a talk-spurt state/silent state determination unit 12a for an uplink, a talk-spurt state/silent state determination unit 12b for a downlink, and a timer 12c.

In a processing of the uplink, the talk-spurt state/silent state determination unit 12a determines whether the period is a talk-spurt period or a silent period, in accordance with a packet size or a stored condition in the buffer.

If the talk-spurt period is detected, a transmitting unit 14 reads out a packet subsequently from the packet buffer 11 as it is, and transmits the packet, in a predetermined timing.

Although, in FIG. 2, the talk-spurt state/silent state determination unit 12a for an uplink and the talk-spurt state/silent state determination unit 12b for a downlink are provided separately for the convenience of the explanation, a single determination unit may perform this determination processing.

When the talk-spurt state/silent state determination unit 12a detects the silent period, a release/allocation request signal generating unit 13 generates a resource release request, and transmits the resource release request, from the transmitting unit 14 to the radio base station eNB.

Meanwhile, as will be described later, when a user resumes the speaking and the talk-spurt state/silent state determination unit 12a determines that the talk-spurt period is resumed, the release/allocation request signal generating unit 13 generates an allocation request signal, and transmits the allocation request signal, from the transmitting unit 14 to the radio base station eNB.

Note that the processes relating to the reception will be described later in relation to the resource release control in a downlink.

Further, the mobile station 10 may include: a radio resource controlling unit that releases the radio resource corresponding to this resource release request, after transmitting the above-described resource release request to a radio base station 20.

Further, the mobile station 10 may include: a radio resource controlling unit that releases the radio resource corresponding to a resource release notice, after receiving the resource release notice from the radio base station 20.

Figure 3:
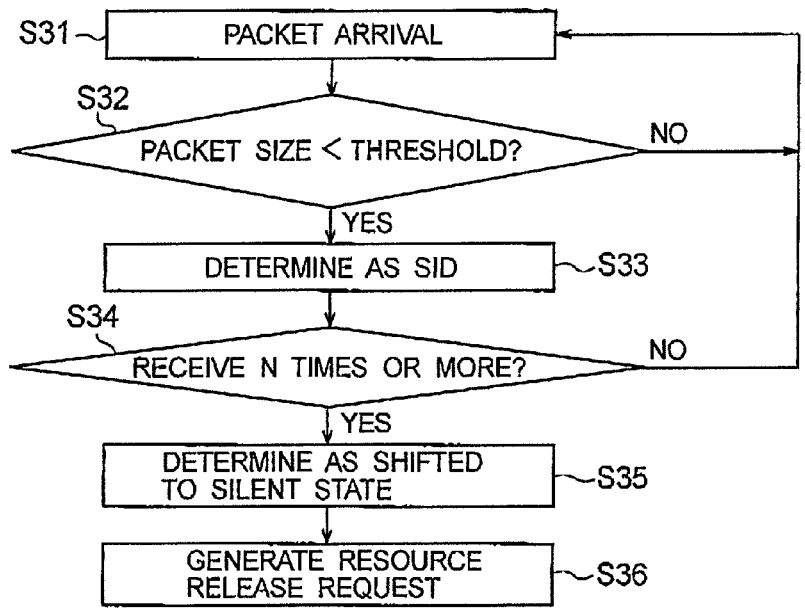
FIG. 3 is a flow chart showing an example of a process of a silent state determination performed by the mobile station.

FIG. 3 shows an example (flow 1) of a process of the silent state determination performed by the talk-spurt state/silent state determination unit 12*a*. In this example of determination, a talk-spurt state and a silent state are determined in accordance with the packet size.

First, when a transmission packet is inputted (S31), the talk-spurt state/silent state determination unit 12*a* determines whether or not the packet size is smaller than a predetermined threshold (S32).

In a case of AMR, even in the silent period not including a speaking, background noise information is transmitted as SID (silent descriptor), in a certain interval (for example, every 160 ms).

The SID has a shorter packet length, as compared with the speech packet. The payload size of the AMR in the minimum rate (4.75 kbps) is 112 bits. Meanwhile, the payload size of the SID is 56 bits.

Not limited to the AMR, the talk-spurt state/silent state determination unit 12*a* can presume a talk-spurt/silent state based on the packet size, by use of a packet size difference between the speech packet and the packet that transmits the noise information.

In step S32, when the packet size is smaller than the threshold, the talk-spurt state/silent state determination unit 12*a* determines that the inputted packet is the SID (S33).

Further, the talk-spurt state/silent state determination unit 12*a* determines whether or not the SID has been continuously received a predetermined number of times (N times) or more (S34).

When the number of the received times is less than the predetermined number, the talk-spurt state/silent state determination unit 12*a* returns to Step S31, and makes determination on the following inputted packet.

When the SID has been continuously received N times or more, a possibility of being in the silent state is high. At this time, the talk-spurt state/silent state determination unit 12*a* determines that the state has been shifted to the silent state (S35), and causes the release/allocation request signal generating unit 13 to generate the resource release request (S36).

Figure 4:
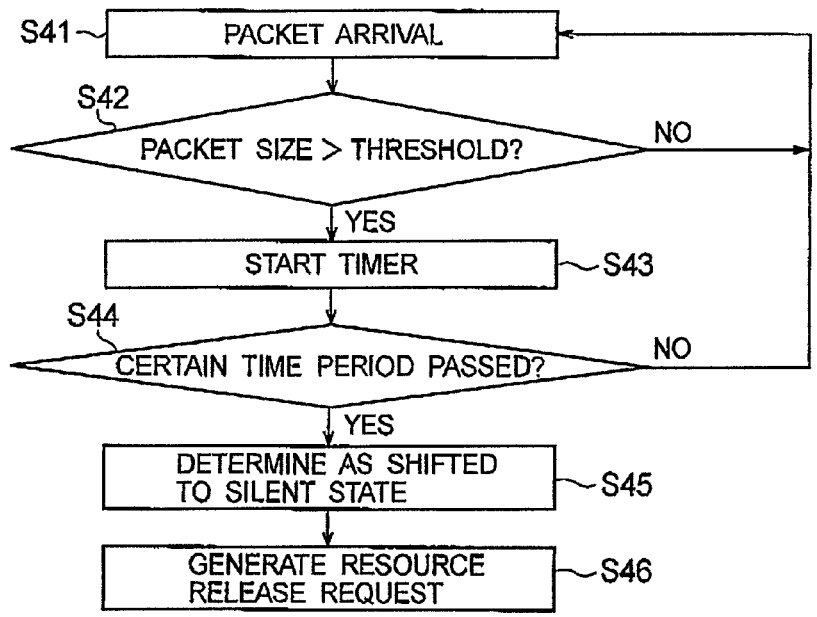
FIG. 4 is a flow chart showing another example of a process of a silent state determination performed by the mobile station.

FIG. 4 shows another example (flow 2) of the process of the silent state determination performed by the talk-spurt state/silent state determination unit 12*a*. In this example of determination, determining whether or not the state is a silent state is performed by use of a timer.

When a transmission packet is inputted (S41), the talk-spurt state/silent state determination unit 12*a* determines whether or not the packet size is larger than a predetermined threshold (S42).

Note that, this threshold does not need to be the same threshold used in the process flow of FIG. 3.

When the packet size is larger than the threshold, the talk-spurt state/silent state determination unit 12*a* determines that the inputted packet is a speech packet, starts the timer 12*c* (S43), and determines whether or not a certain time period has passed (S44).

The timer 12*c* is reset and started every time when the packet (speech packet) having a size larger than the threshold arrives. Accordingly, when the certain time period has passed from the start of the timer 12*c*, i.e., the speech packet does not arrive for the certain time period (YES in S44), the talk-spurt state/silent state determination unit 12*a* determines that the state has been shifted to the silent state (S45).

Further, the talk-spurt state/silent state determination unit 12*a* causes the release/allocation request signal generating unit 13 to generate a resource release request (S46).

Figure 5:
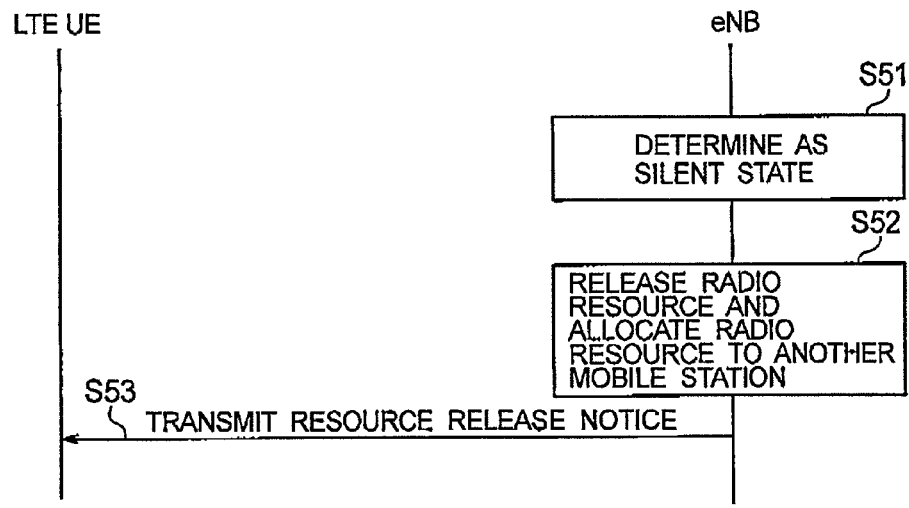
FIG. 5 is a sequence diagram of the resource release control in accordance with a silent state determination for the uplink, the determination being performed by a radio base station.

Next, an example in which the radio base station (eNB) in the uplink determines whether the state is the talk-spurt state or the silent state will be described. FIG. 5 is a diagram showing a release sequence of a radio resource based on the silent state detection in the radio base station.

The radio base station determines that the received packet is in a silent state, and detects a silent period (S51).

When the silent period is detected, the radio base station temporarily release the radio resource persistently allocated to the mobile station UE and allocates the radio resource to another mobile station, while generating a resource release notice (S52). Then, the radio base station transmits the resource release notice to the mobile station (S53).

Figure 6:
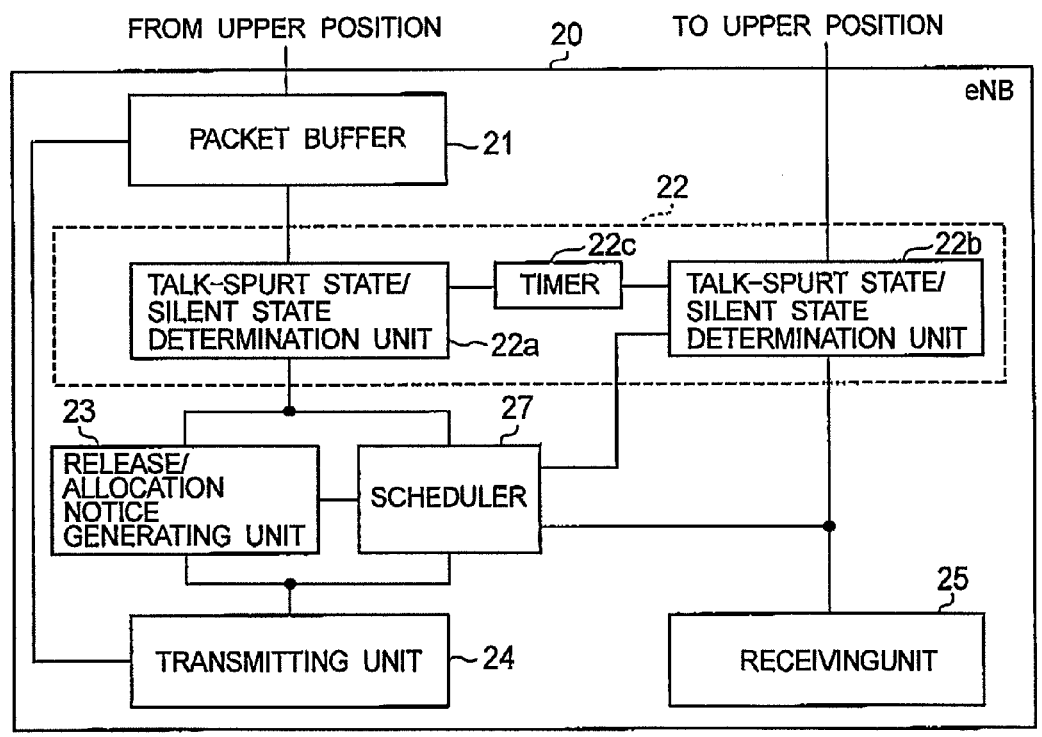
FIG. 6 is a schematic block diagram of the radio base station that performs the resource release control of FIG. 5.

FIG. 6 shows an example of a configuration of the radio base station (eNB) 20. The radio base station 20 includes: a receiving unit 25 that receives a packet from the mobile station 10, and a talk-spurt state/silent state determination unit 22 that determines whether the inputted packet is in the talk-spurt state or in the silent state.

The talk-spurt state/silent state determination unit 22 includes a talk-spurt state/silent state determination unit 22*a* that determines the state of the packet in the downlink, and a talk-spurt state/silent state determination unit 22*b* that determines the state of the packet in the uplink, and a timer 22*c*.

Although, in FIG. 6, the talk-spurt state/silent state determination unit 22*b* for an uplink and the talk-spurt state/silent state determination unit 22*a* for a downlink are provided separately in 6, a single unit may be provided.

A common talk-spurt state/silent state determination unit for an uplink and a downlink may be used. Further, a second buffer may be interposed between the talk-spurt state/silent state determination unit 22*b* and the receiving unit 25, independent from a packet buffer 21 relating to a backbone, or the packet buffer 21 may be shared.

When a silent period is detected in the talk-spurt state/silent state determination unit 22*b*, a scheduler 27 releases the radio resource persistently allocated to the mobile station that has transmitted the silent state packet, and allocates the radio resource to another mobile station.

Simultaneously, a release/allocation notice generating unit 23 generates a resource release notice, and notifies the resource release notice from the transmitting unit 24 to the mobile station.

The release/allocation notice generating unit 23 generates an allocation notice to a user terminal to which a released resource is newly allocated, and transmits this allocation notice from the transmitting unit 24.

Note that, when the resource release request is received from the mobile station having the configuration as shown FIG. 1, the scheduler 27 temporarily releases the radio resource allocated to this mobile station.

Further, when a resource allocation request to be described later is received from the mobile station, the scheduler 27 allocates a usable resource to this mobile station.

Processing relating to the transmission from the radio base station 20 will be described later in relation to the resource release control in the downlink.

FIG. 7 is a flow chart showing an example of a process of the determination performed in accordance with a packet size, among the silent state determinations performed by the talk-spurt state/silent state determination unit 22b of the radio base station 20.

When a packet is arrived from the mobile station (S71), the talk-spurt state/silent state determination unit 22b determines whether or not the packet size is smaller than a predetermined threshold (S72).

When the packet size is smaller than the threshold, the talk-spurt state/silent state determination unit 22b determines that the inputted packet is the SID (S73).

Subsequently, the talk-spurt state/silent state determination unit 22b determines whether or not the SID has been continuously received a predetermined number of times (N times; N1) or more (S74).

When the SID is received continuously N times or more from the mobile station (YES in S74), the talk-spurt state/silent state determination unit 22b determines that the state has been shifted to the silent state (S75), and causes the release/allocation notice generating unit 23 to generate a resource release notice and/or an allocation notice to another mobile station (S76).

FIG. 8 is a flow chart showing an example of a process of the determination performed by use of the timer, among the silent state determinations performed by the talk-spurt state/silent state determination unit 22b of the radio base station 20.

When a packet is arrived from the mobile station (S81), the talk-spurt state/silent state determination unit 22b determines whether or not the packet size is larger than a threshold (S82). This threshold does not need to be the same value as the threshold used in the process flow of FIG. 7.

When the packet size is larger than the threshold, the talk-spurt state/silent state determination unit 22b determines the above-described packet as a speech packet, and starts the timer 22c (S83).

When a certain time period passes after the start of the timer 22c (YES in S84), the talk-spurt state/silent state determination unit 22b determines that the state has been shifted to the silent state (S85), and causes the release/allocation notice generating unit 23 to generate a resource release notice and/or an allocation notice to another mobile station (S86).

Next, with reference to FIGS. 9 to 12, an uplink radio resource reallocation to the mobile station that resumes the speaking will be described.

FIG. 9 is a sequence diagram of a resource reallocation in accordance with a resource allocation request from the mobile station UE.

When a transmission packet is inputted (S91), the mobile station determines that the talk-spurt period is resumed (S92), generates a resource reallocation request, and transmits this resource reallocation request to the radio base station (S93 and S94).

The radio base station having received the reallocation request resumes the persistent allocation of a radio resource to this mobile station (S95), and notifies the resource allocation notice to the mobile station (S96).

The mobile station sequentially reads out packet from the buffer (S97), and transmits the packet by using the radio resource that is reallocated (S98).

Figure 10:
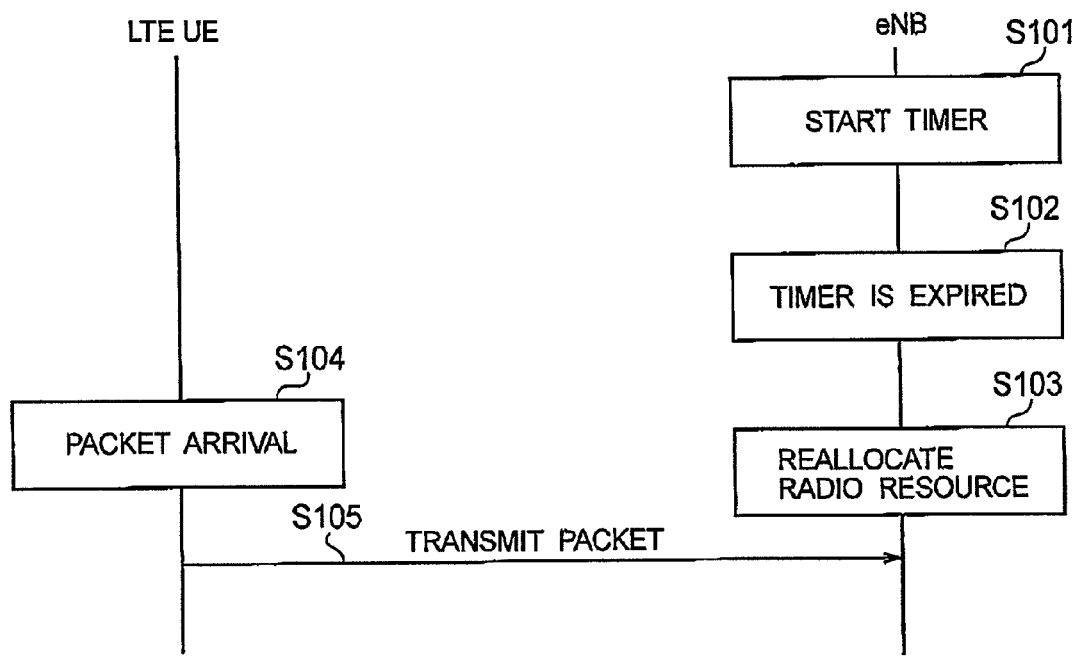
FIG. 10 is a sequence diagram of a resource reallocation for the uplink by using a timer control, the resource reallocation being performed by the radio base station.

FIG. 10 is a sequence diagram of the resource reallocation by using a timer control in the radio base station (eNB).

The radio base station starts the timer 22c after releasing the radio resource persistently allocated to the mobile station (S101).

When the timer expires (S102), the radio base station reallocates the radio resource to this mobile station (S103).

Meanwhile, in the mobile station, the user resumes speaking, and the speech packet is inputted to the buffer (S104).

This packet is transmitted to the radio base station by using the radio resource that is reallocated (S105).

Figure 11:
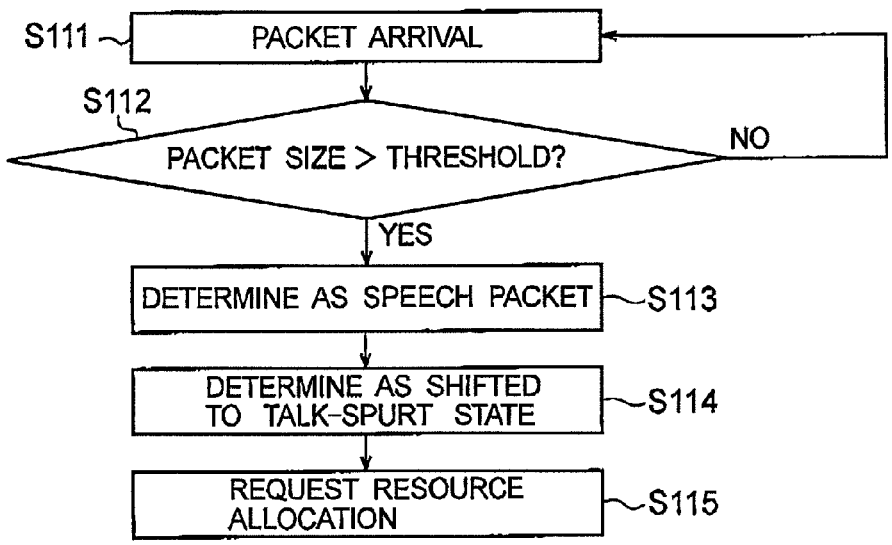
FIG. 11 is a flow chart showing an example of a process of a talk-spurt state determination performed by the mobile station in the resource reallocation of FIG. 9.
Figure 12:
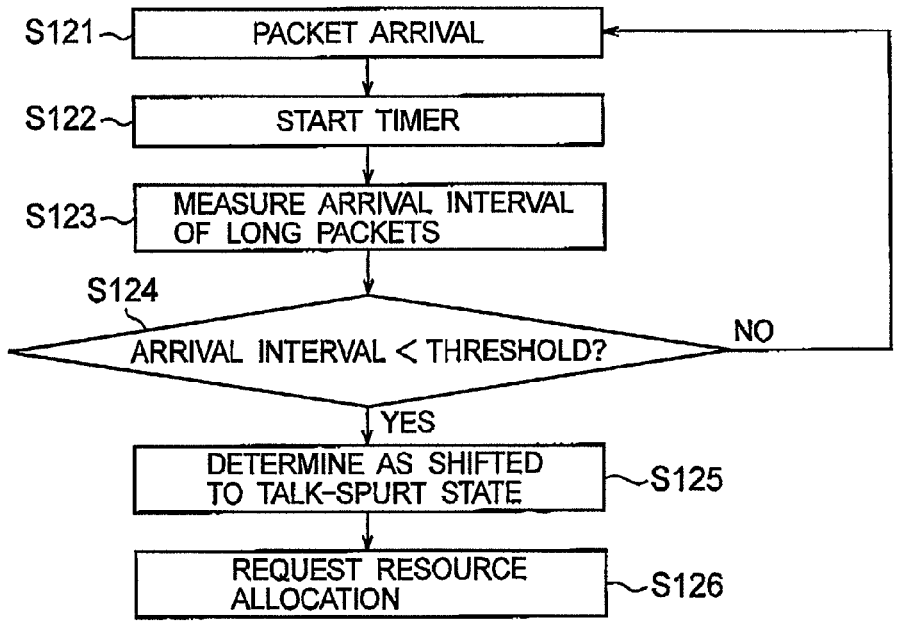
FIG. 12 is a flow chart showing another example of a process of the talk-spurt state determination performed by the mobile station in the resource reallocation of FIG. 9.

FIGS. 11 and 12 are examples of the talk-spurt period determination performed by the mobile station in the sequence of FIG. 9. A talk-spurt state determination by using the packet size is performed in FIG. 11, while a talk-spurt state determination by using the timer is performed in FIG. 12.

In FIG. 11, when a packet is inputted from the upper layer (S111), the talk-spurt state/silent state determination unit 12a (see FIG. 2) determines whether or not the packet size is larger than a predetermined threshold (S112).

When the packet size is larger than the threshold, the talk-spurt state/silent state determination unit 12a determines that the inputted packet is a speech packet (S113), determines that the state has been shifted to the talk-spurt state (S114), and causes the release/allocation request signal generating unit 13 to generate a resource allocation request (S115).

In the flow of FIG. 12, when a packet is inputted from the upper layer (S121), the timer 12c is started (S122), and a packet arrival interval until an arrival of the following packet is measured (S123).

The talk-spurt state/silent state determination unit 12a determines whether or not the arrival interval is smaller than a predetermined threshold (S124). When the arrival interval is smaller than the threshold, the talk-spurt state/silent state determination unit 12a determines that the state has been shifted to the talk-spurt state (S125), and causes the release/allocation request signal generating unit 13 to generate a resource allocation request (S126).

This utilizes the fact that the arrival interval of a speech packet is shorter than that of the SID.

<Radio Resource Release Control in a Downlink>

Next, a release control of a downlink radio resource will be described with reference to FIGS. 13 to 17.

FIG. 13 shows a radio resource release sequence in accordance with a resource release request from the mobile station UE.

The radio base station 20 reads out a packet from the buffer 21 (S131), and transmits the packet to a destination mobile station 10 (S132).

When the talk-spurt state/silent state determination unit 12b of the mobile station 10 having received the packet determines that the state is a silent state (S133), the release/allocation request signal generating unit 13 generates a resource release request (S134), and transmits this resource release request to the radio base station 20 (S135).

In accordance with the resource release request, the radio base station 20 allocates the radio resource that has been used for the communication with this mobile station 10, to another mobile station (S136).

The radio base station 20 may arbitrarily notify a resource release response to the mobile station (S137).

A silent state determination in step S133 can be performed by use of the received packet size or the timer, as shown in the flows of FIG. 3 or 4.

FIG. 14 shows a radio resource release sequence in accordance with the silent state determination in the radio base station (eNB).

The radio base station 20 reads out a packet from the buffer 21 (S141) and transmits the packet to the destination mobile station (S142), while performing a silent state determination in the talk-spurt state/silent state determination unit 22a (S143).

When the state is determined as the silent state, the radio base station 20 releases the radio resource that has been allocated to the communication to this mobile station, allocates the radio resource to another mobile station (S144), and notifies the release of this radio resource to the mobile station (S145).

Note that the determining that the state is the silent state in step S143 is the same as that of the determination processing shown in the flows of FIGS. 7 and 8, for example.

Figure 15:
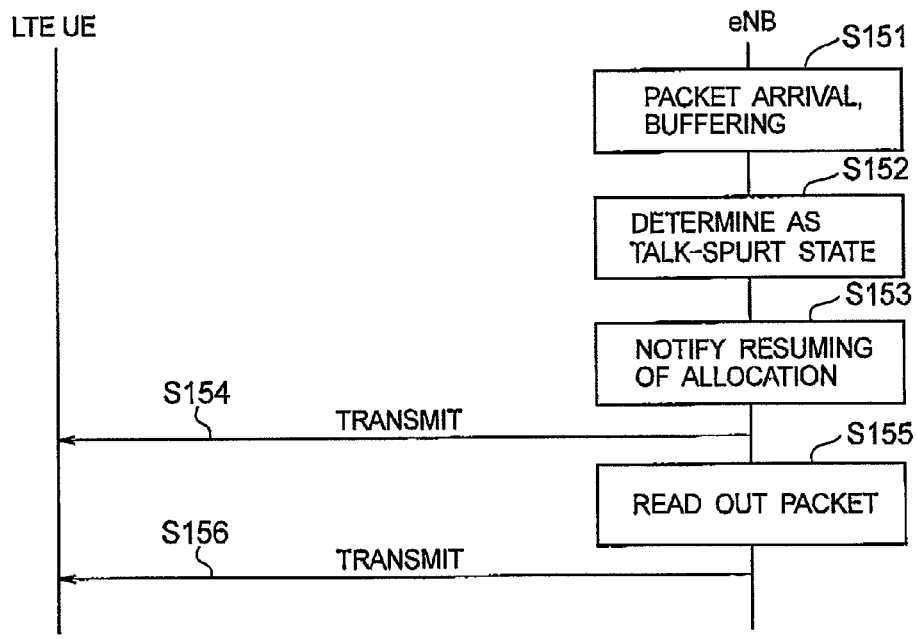
FIG. 15 is a sequence diagram of the resource reallocation control in the downlink, according to talk-spurt state determination in the radio base station.

FIG. 15 shows a radio resource reallocation sequence when the communicating partner resumes speaking, and the state is changed from the silent state to the talk-spurt state.

In the radio base station 20, the packet inputted from the upper layer is buffered (S151), and the talk-spurt state/silent state determination unit 22a determines that the state is the talk-spurt state (S152).

When the state is determined as the talk-spurt state, the radio base station 20 resumes the radio resource allocation to this mobile station (S153), and transmits a resource reallocation notice (S154).

Subsequently, the radio base station 20 reads out a packet from the buffer 21 (S155), and transmits the packet to the mobile station (S156).

Figure 16:
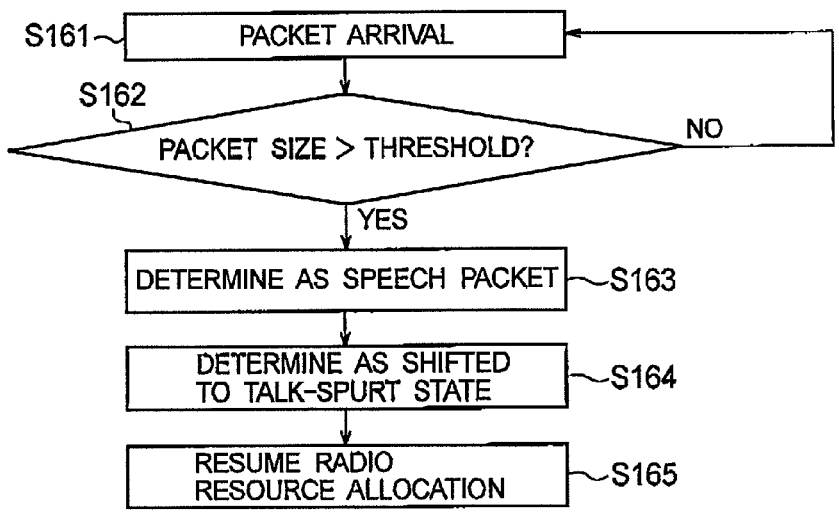
FIG. 16 is a flow chart showing an example a process of the talk-spurt state determination performed by the radio base station.
Figure 17:
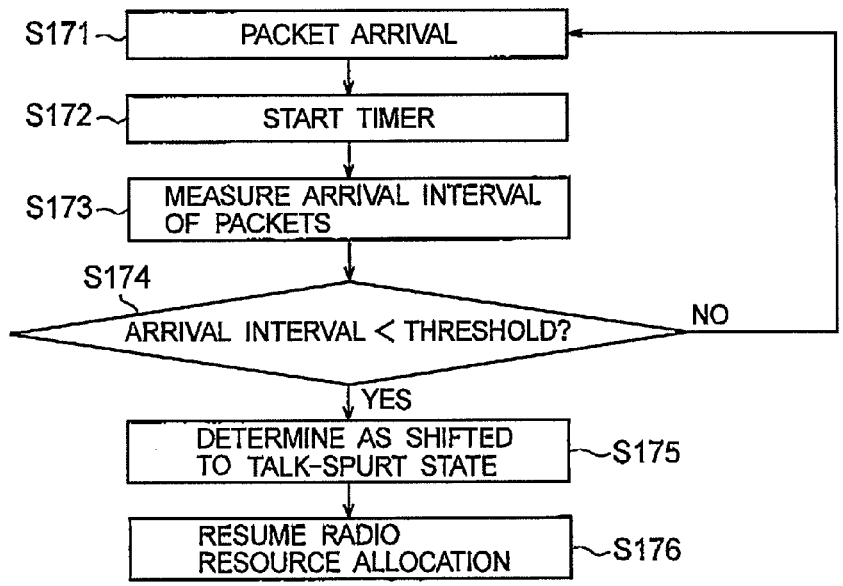
FIG. 17 is a flow chart showing another example of a process of the talk-spurt state determination performed by the radio base station.

FIGS. 16 and 17 show process flows of determining whether or not the state is the talk-spurt state, in step S152. Determining whether or not the state is the talk-spurt state by using the packet size is performed in FIG. 16, while determining whether or not the state is the talk-spurt state by using the timer is performed in an example of FIG. 17.

In the flow of FIG. 16, when a packet is arrived from the upper layer (S161), the talk-spurt state/silent state determination unit 22a determines whether or not the packet size is larger than a threshold (S162).

When the packet size is larger than the threshold, the talk-spurt state/silent state determination unit 22a determines that the arrived packet is a speech packet (S163), determines that the state has been shifted to the talk-spurt state (S164), and causes the release/allocation request signal generating unit 13 to generate a resource allocation request (S165).

In the flow of FIG. 17, when a packet is inputted from the upper layer (S171), the timer 22c is started (S172), and a packet arrival interval until the arrival of the following packet is measured (S173).

The talk-spurt state/silent state determination unit 22a determines whether or not the arrival interval is smaller than a predetermined threshold (S174). When the arrival interval is smaller than the threshold, the talk-spurt state/silent state determination unit 22a determines that the state has been shifted to the talk-spurt state (S175). Then, the talk-spurt state/silent state determination unit 22a allocates the resource to this mobile station at the scheduler 27, and causes the release/allocation notice generating unit 23 to generate a resource release notice (S176).

As described above, according to the present invention, by determining whether or not a state is a talk-spurt state or a silent state, a part of the radio resource persistently allocated in the silent state can be released and allocated to another mobile station. Accordingly, an effective utilization of the radio resource can be achieved.

Modified Example

The above-described resource release request may be transmitted by using a buffer status report (BSR: Buffer Status Report) reporting a data amount stored in the transmission buffer of the mobile station.

Here, the buffer status report is transmitted as MAC control information (MAC control element).

Specifically, the release/allocation request signal generating unit 13 of the mobile station 10 is configured to generate the above-described resource release request, by using a buffer status report having a specific report format.

Figure 18A:
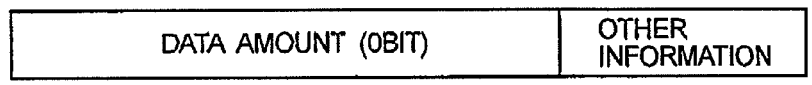
FIG. 18A is a view showing an example of a buffer status report used for notifying a resource release request according to an embodiment.

For example, as shown in FIG. 18A, the release/allocation request signal generating unit 13 of the mobile station 10 may be configured to generate the above-described resource release request by using a buffer status report notifying the data amount of 0 byte.

Figure 18B:
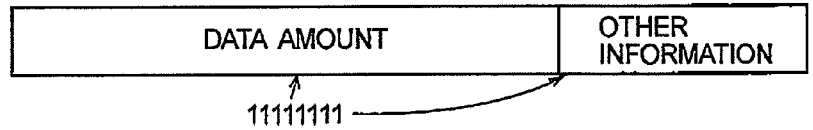
FIG. 18B is a view showing an example of the buffer status report used for notifying the resource release request according to this embodiment.
Figure 18C:
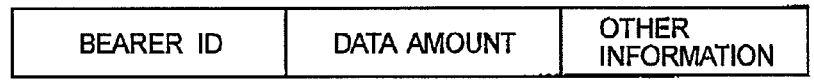
FIG. 18C is a view showing an example of the buffer status report used for notifying the resource release request according to this embodiment.

Further, the release/allocation request signal generating unit 13 of the mobile station 10 may be configured to generate the above-described resource release request by using a buffer status report including a specific bit string (for example, 11111111) that indicates a resource release request as shown in FIG. 18B.

Further, the release/allocation request signal generating unit 13 of the mobile station 10 may be configured to generate the above-described resource release request by using a buffer status report reporting the data amount stored in the transmission buffer of the mobile station 10, the mobile station 10 relating to a radio access bearer to which the radio resource is persistently allocated.

Here, it is assumed that the radio access bearer is established between the mobile station 10 and a radio base station apparatus in a mobile communication system of the LTE method.

For example, the release/allocation request signal generating unit 13 of the mobile station 10 specifies, by a bearer ID (or bearer group ID), the radio access bearer (persistent radio access bearer) to be a reporting target of the data amount by use of the buffer status report. Subsequently, when the data amount stored in the transmission buffer becomes 0 byte, the release/allocation request signal generating unit 13 generates and transmits a buffer status report notifying 0 byte as a resource release request, to the radio resource persistently allocated.

Further, the release/allocation request signal generating unit 13 of the mobile station 10 may be configured to transmit the resource release request by using a scheduling request requesting, at the mobile station 10, an allocation of uplink dedicated resources.

Figure 19:
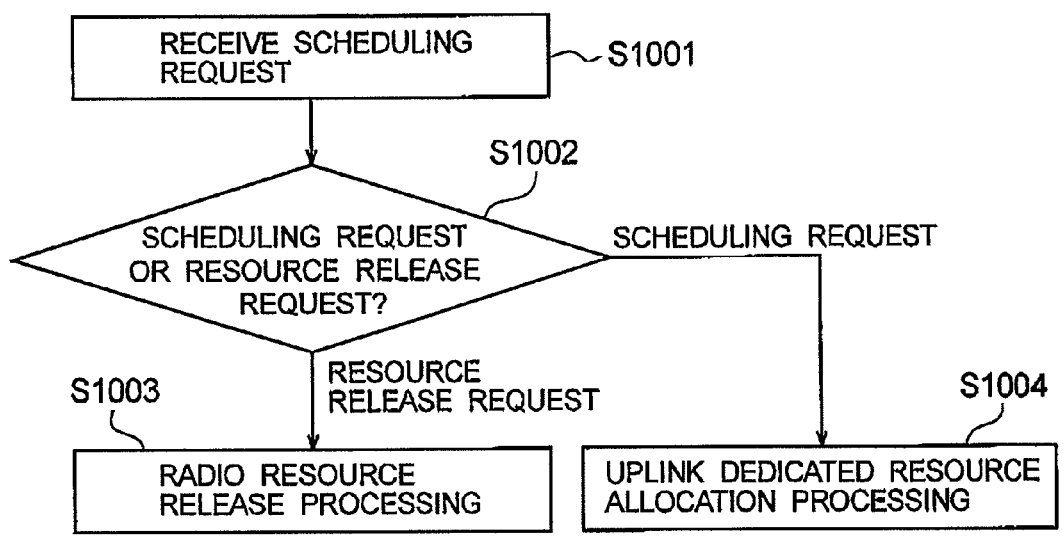
FIG. 19 is a flow chart showing an example of a process receiving a scheduling request in the radio base station.

When the radio base station 20 receives a scheduling request from the mobile station 10 as shown in FIG. 19 (S1001), the radio base station 20 determines whether the scheduling request indicates a usual scheduling request or a resource release request (S1002).

When the radio base station 20 determines that the usual scheduling request is indicated, the radio base station 20 performs the uplink dedicated resource allocation processing to the mobile station 10, in step S1004.

On the other hand, when the radio base station 20 determines that the resource release request is indicated, the radio base station 20 performs the radio resource release processing of the radio resource persistently allocated to the mobile station 10, in step S1003.

INDUSTRIAL APPLICABILITY

As explained above, according to the present invention, a release control of a persistently-allocated radio resource can be performed based on whether the state is the talk-spurt state or the silent state. As a result, an effective utilization of the radio resource can be achieved.

The invention claimed is:

1. A radio resource release controlling method that controls a release of a radio resource in a voice communication performed by a mobile station using the radio resource that is persistently allocated, the radio resource release controlling method comprising:

determining whether or not a state is a silent state, in accordance with a size of an inputted packet;

temporarily releasing the radio resource, when the state is determined as the silent state; and transmitting a resource release request to a radio base station, when the silent state is detected, wherein determining that the state is the silent state is performed by the mobile station performing the voice communication, the resource release request is transmitted by using a buffer status report reporting a data amount stored in a transmission buffer of the mobile station, the mobile station relates to a radio access bearer to which the radio resource is persistently allocated, the buffer status report includes a specific bit string that indicates the resource release request, and the buffer status report reports a data amount of 0 bytes.

2. A mobile station, comprising:

a determination unit configured to determine whether an inputted packet is in a talk-spurt state or in a silent state;

a message generating unit configured to generate a resource release request, when the determination unit determines that the inputted packet is in the silent state; and a transmitting unit configured to transmit the resource release request to a radio base station, wherein the resource release request is transmitted by using a buffer status report reporting a data amount stored in a transmission buffer of the mobile station, the mobile station relates to a radio access bearer to which the radio resource is persistently allocated, the buffer status report includes a specific bit string that indicates the resource release request, and the buffer status report reports a data amount of 0 bytes.

* * * * *